(No Model.)  2 Sheets—Sheet 1.

J. H. SCHULTE.
TYPE WRITING MACHINE.

No. 450,592. Patented Apr. 14, 1891.

Attest:
Andrew U. Steiger.
George B. Wilton,

Inventor:
John H. Schulte
By Jacob Felbel
Atty:

(No Model.) 2 Sheets—Sheet 2.
J. H. SCHULTE.
TYPE WRITING MACHINE.
No. 450,592. Patented Apr. 14, 1891.
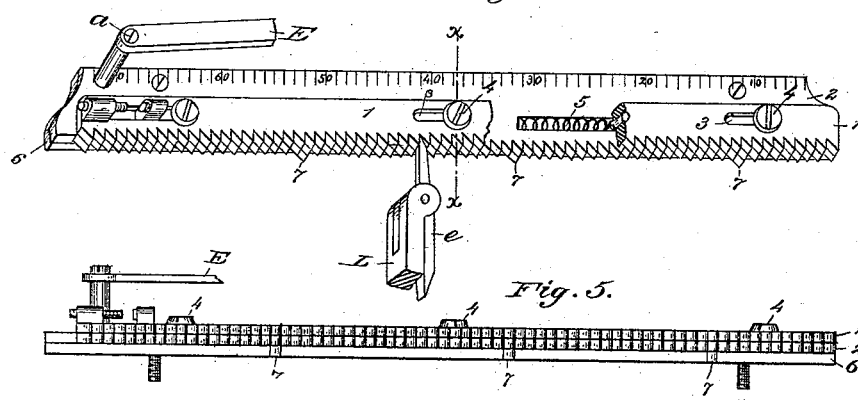
Fig. 3.
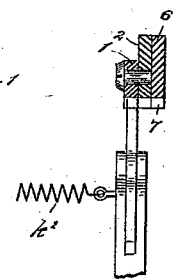
Fig. 4.
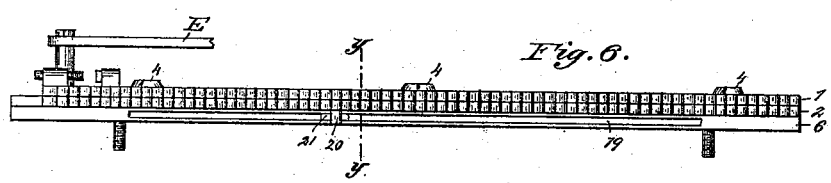
Fig. 5.
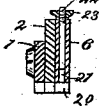
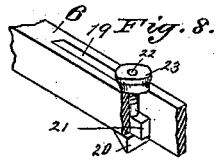
Fig. 6.
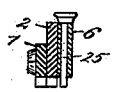
Fig. 7.
Fig. 8.
Fig. 9.
Fig. 10.
Fig. 11.
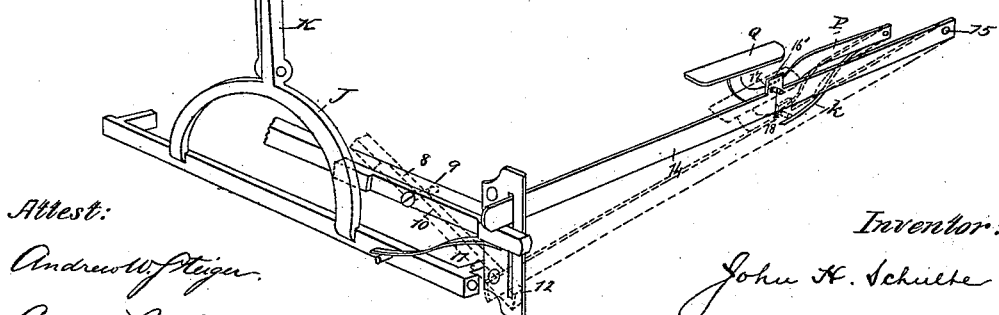
Fig. 12.
Attest:
Andrew W. Steiger
George D. Wilton
Inventor:
John H. Schulte
By Jacob Felbel
Atty.

UNITED STATES PATENT OFFICE.

JOHN H. SCHULTE, OF JERSEY CITY, NEW JERSEY, ASSIGNOR TO THE AMERICAN WRITING MACHINE COMPANY, OF NEW YORK, N. Y.

TYPE-WRITING MACHINE.

SPECIFICATION forming part of Letters Patent No. 450,592, dated April 14, 1891.

Application filed July 22, 1886. Serial No. 208,705. (No model.)

*To all whom it may concern:*

Be it known that I, JOHN H. SCHULTE, a citizen of the United States, and a resident of Jersey City, in the county of Hudson and State of New Jersey, have invented certain new and useful Improvements in Type-Writing Machines, of which the following is a specification.

My invention relates more particularly to that class of type-writing machines employing a sliding carriage in which is mounted a roller or platen for supporting the paper to be printed upon, and has for its main objects, first, the production of a machine in which the means for disengaging the carriage from the step-by-step spacing mechanism are connected to the spacing mechanism and are operated automatically thereby, and, secondly, in the production of a machine in which there is provided a stop or abutment for arresting the carriage at a predetermined point after its releasement from the step-by-step spacing mechanism; and to these main ends and objects my invention consists, first, in combining with the step-by-step spacing mechanism a mechanism or means for releasing the carriage therefrom, and, secondly, in providing the carriage with a stop or abutment to coact with the spacing mechanism, so that it may be automatically detained after disengagement from the latter; and my invention also consists in certain features of construction, all of which will be hereinafter more fully described and claimed.

Figure 1:
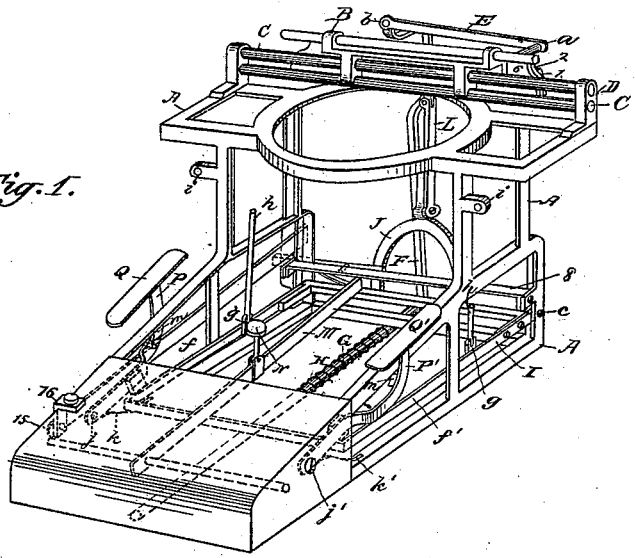
Figure 2:
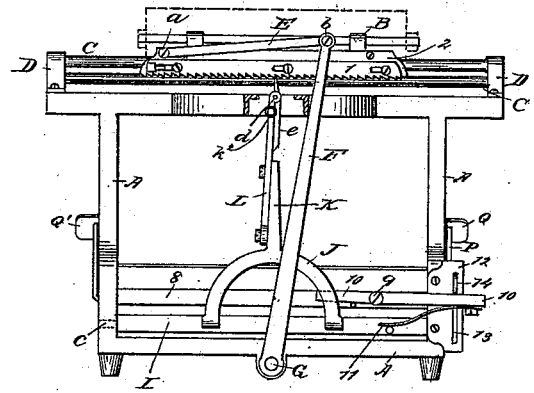

In the accompanying drawings, Figure 1 is a perspective view of a machine embodying my invention with the inking mechanism and paper platen or roller removed. Fig. 2 is a rear view of the same with the platen added in dotted lines. Fig. 3 is a perspective view of the feed-racks and retaining-pawl. Fig. 4 is a cross-section taken at the line $x x$ of Fig. 3. Fig. 5 is a bottom view of the feed-racks shown at Fig. 3. Fig. 6 is a bottom view of feed-racks embodying one modification of my invention. Fig. 7 is a cross-section taken at the line $y y$ of Fig. 6. Fig. 8 is a detail sectional perspective view of one of the bars of the feed-racks shown at Fig. 6. Fig. 9 is a bottom view of the feed-racks embodying another modification of my invention. Fig. 10 is a cross-section taken at the line $z z$ of Fig. 9. Fig. 11 is an elevation of the tooth or stop-pin employed in the modification shown at the last named two figures. Fig. 12 is a skeleton perspective view taken at the left-hand rear corner of the machine, and showing the means for throwing out of engagement the retaining-pawl and step-by-step feeding-racks of the carriage.

In the various views the same parts will be found designated by the same letters and numerals of reference.

A is the main frame of the machine, and B the sliding carriage thereof, mounted, as usual, to move and turn freely upon the guide rods or bars C C, secured in ears or brackets D D, projecting upwardly from the main frame.

At the rear of the carriage B is pivoted at $a$ one end of a link or connecting-bar E, the other end of which is pivoted at $b$ to the upper end of a vibrating bar F, the lower end of which is pivoted or hinged at the bottom of the main frame and is connected to a rod or shaft G, bearing a spiral spring H, having a tension toward the left of the machine.

I represents a rectangular frame, which is pivoted at $c$ to the rear portion of the main frame, and is provided with a vertically-extending yoke piece or fork J and arm K. To the latter is secured by screws or otherwise a standard or support L, in the upper end of which is pivoted loosely, by a horizontal pin $d$, a retaining dog or pawl $e$ for use in connection with the feed-racks of the carriage, as will be hereinafter more fully explained.

The horizontally-arranged rectangular frame I is free to vibrate up and down and move the dog or pawl $e$ back and forth in a plane intersecting the paper-carriage.

Connected at $g$ to the longitudinal bars $f f'$ of the frame I are rods $h h$, which are coupled at their upper ends to the inking-ribbon feed-spools of the machine in the well-known manner. To conduce to clearness in the drawings, the rods $h h$ are broken away and the inking-ribbon and its feeding-spools are omitted, but the bearings for the latter are shown at $i i$, Fig. 1.

The key-levers of the machine are all omitted save one, which is marked M, and which is fulcrumed at the front of the machine and rests upon the front end of the frame I in the customary manner.

N designates a press-button secured to said key-lever, and, as usual, bears on its face a letter, numeral, or other character indicating the type-bar to which said key-lever is connected. The type-bars and the usual connecting-wires between them and the key-levers are not shown, as their presence would only unnecessarily complicate the drawings.

At the sides of the machine and near the front are pivoted, at $j\ j'$, levers P P', provided at their free ends with heads or plates Q Q' for conveniently operating them, and provided about midway of their lengths with blocks or projections which lie immediately over the free end of the frame I and push the same downwardly when the levers P and P' are depressed. Underneath the levers P P' are flat springs $k\ k'$ for returning them to their normal positions, and pins or stops $m\ m'$ are formed on the levers P P' and limit their upward movements by striking against the main frame A of the machine. The support L is also provided with a spring $k^2$ for returning it, the pawl e, and the frame I to their normal positions after having been vibrated.

The machine shown and thus far described will be recognized by those skilled in the art as the type-writing machine designated as the "Caligraph;" and it is to this species of machines that my improvements, now to be more fully set forth, are more particularly adapted, though with few variations in details they may be embodied in machines of other known constructions.

The carriage B is provided with the two feed-racks usually found on the caligraph, and are marked here in the drawings 1 and 2. As they are constructed and operate in substantially the manner shown and described in the Letters Patent granted to Geo. W. N. Yost, March 18, 1884, No. 295,469, no very extended description of their construction and mode of operation is deemed to be necessary in this specification.

The toothed bar or rack 1 is formed with elongated slots 3 3 and the rack 2 with threaded holes opposite thereto, and screw pins or studs 4 4 are passed through the slots in the rack 1 and engaged with the holes in the rack 2. A spiral spring 5 housed in the rack 2 has one of its ends connected to the rack 2 and the other to the rack 1, and is arranged to throw the latter to the left of the machine every time the dog e is disengaged from its teeth. To these bars or racks 1 and 2 I have added another bar 6 and located it on that side of the bar 2 nearest the front of the machine. This bar 6 is connected to the bar 2 in any suitable manner, so that they may both move bodily together with the carriage.

The bars 1 and 2 are provided, as usual, with many saw-like teeth arranged equidistantly apart for their whole lengths, while the bar 6 (illustrated at Figs. 3, 4, and 5) is provided with only a few teeth 7 7 7, which are formed integral therewith, and which are arranged in line with the teeth on the bars 1 and 2.

The bars 1 and 2, in conjunction with the pawl or dog e and the mechanism for vibrating it back and forth, constitute an escapement or step-by-step feed mechanism for the carriage—that is to say, when the dog e is in working engagement with the racks 1 and 2 the carriage can be moved by its driving mechanism only step by step or a distance equal to the space between the two adjacent teeth on either of the bars 1 2 at each back-and-forth vibration of the dog e.

By the employment of the bar 6 with its teeth or stops 7 in connection with the means to be presently described I am enabled to throw the dog e out of engagement with the racks 1 and 2 at will and permit the driving mechanism of the machine to move the carriage a greater distance than it could when the pawl was in engagement with the racks 1 and 2. The rack 6 may be provided with teeth 7, set opposite to or in line with every second tooth on the bars 1 and 2, so that the carriage may be moved twice as far by the driving mechanism every time the pawl is thrown out of engagement with the racks 1 and 2 and into engagement with the rack 6. In this manner the machine may be used for providing a longer space on the paper for the printing of capital letters and such other letters and characters of the machine as require a long space, and thus conduce to a more uniform appearance of the writing; but of course the rack 6 may have a less number of teeth, as shown, and the kind of writing just referred to not be provided for.

At Figs. 3, 4, and 5 the rack 6 is provided with three teeth, all immovable, while at Figs. 6, 7, 8, 9, and 10 the rack is provided with only one tooth, and that adjustable.

As the racks are shown constructed in the drawings, the machine is adapted particularly for the writing or printing of bills, schedules, statements of account, &c. As is well known to those familiar with the operations of the type-writer as now made, considerable difficulty is experienced and much time and labor lost in performing this class of work. In the making out of bills, for instance, where there are several lines of items to be enumerated and a column of figures to be written it will be understood that nearly all the lines of items will vary in length of matter and that the charges or amounts therefor must all be arrayed in a column in the regular order of units, tens, &c. To do this work in the prior machines it is the practice of the type-writer operator to mentally select at the commencement of the work a point (designated by a certain number on the scale) at which to commence the printing of figures of the column to be prepared—say, for example, at No. 50 on the scale attached to the main frame of the machine. The writing of the item is then begun. Say it is "To one ton of coal." This written, there will perhaps be twenty spaces or notches on the racks which will have to be moved to the left before the point at which the amount to be written can be reached, and then the printing of the amount is begun. This movement of the carriage is generally effected by a step-by-step action through the escapement spacing mechanism of the machine, and is necessarily slow; but in some machines there is pivoted in connection with the racks a device which may be reached (though not without inconvenience) and operated to throw out of engagement the step-by-step feeding mechanism and permit the carriage to travel quickly toward the left of the machine.

The means for throwing the dog e out of engagement with the racks 1 and 2 and into engagement with the rack 6 will now be described.

To a cross-bar 8, forming a part of the main frame of the machine, is pivoted at 9 a lever 10, the inner arm of which, during the normal condition of the lever, lies between the bifurcated fork J and the cross-bar 8. Beneath the outer arm of said lever is arranged a spring 11 for returning the lever to its first position after having been depressed and after the force applied thereto has been removed. Secured to the main frame of the machine is a guide-plate 12, having a vertical slot 13, in which works the free end of a lever 14, that is pivoted at 15 to the main frame or to a stand or bracket 16, secured thereto. The lever 14 is formed or provided with a lug or ear 16', which is perforated at 17 for the accommodation of a horizontal pin 18, projecting outwardly from the curved part of the lever P. The free end of the lever 14 rests upon the outer arm of the lever 10 and moves it downwardly when the lever 14 is depressed by the lever P acting through the pin 18. The inner arm of the lever 10 when in the position shown in full lines in the drawings acts as a stop or abutment to the fork or arm J and limits the forward vibration of the same and of the dog e connected thereto. In this position of the lever 10 the dog can be vibrated back and forth only a distance equal to the distance from center to center of the two racks 1 and 2; but when the lever is vibrated by the depression of the lever 14, as shown in dotted lines at Fig. 12, the dog may be thrown farther forward and brought into the vertical plane occupied by the third rack 6, and thus disengaged from the racks 1 and 2. When the dog is moved this extended distance, the driving mechanism of the machine, represented by the parts E, F, G, and H, is free to propel the carriage swiftly toward the left of the machine until a tooth on the third rack strikes against the dog, when the carriage is arrested; but the carriage may be moved farther on toward the left by the escapement mechanism by releasing the pressure on the lever 14 and permitting the dog to re-engage and coact with the teeth on the racks 1 and 2. The step-by-step spacing between words, &c., in ordinary writing I prefer to effect by depressions of the lever P' at the right-hand side of the machine and the longer rapid spacing for bill-work by depression of the lever P at the left-hand side of the machine.

In connection with the use of the third rack 6 I propose to employ a scale similar to that on the frame of the machine and that on the carriage in front of the paper-roller. This scale may be marked on the upper edge or face of the rack 6 or on the rear side of the bar 2, as shown at Fig. 3, or it may be otherwise applied. The graduations of the scale are arranged, as customary, relatively to the number and location of the teeth on the racks 1 and 2. The teeth 7 on the additional rack 6 in Fig. 3 are in line (transversely of the carriage) with the tenth, thirtieth, and fiftieth teeth on the racks 1 and 2. A description of the mode of operation and use of the machine may now be referred to, which, taken in connection with what has already been said and with the drawings, will enable any one skilled in the art to make and use type-writers embodying my improvements.

Supposing the carriage to be at the extreme right of the machine and the moving parts all in the relative positions shown in full lines in the drawings, and it be desired to do ordinary type-writing, the key-levers are worked in the usual way and the spacing between words effected (without using the rack 6) by depressing the lever P' in the customary manner of operating the caligraph; but if it be desired to do bill-work and avoid step-by-step working the lever P is employed. Say now the operator desires to write on one line "To one ton of coal" and the amount "$5.00," and wishes to place the numerals (5.00) at a point on the paper designated by the number "30" on the scale in front of the platen or roller. The words "To one ton of coal" will be written in the usual manner and will, with the necessary spaces between words, use eighteen teeth on the bar 2. To move the carriage now at once to the point represented by the numeral "30" (at which the operator is aware there is a tooth) the lever P is pushed well down and with it the lever 14, by which operation the inner arm of the lever 10 is swung up to the position shown in dotted lines, and the dog e, through the action of the frame I and arms J, K, and L, vibrated forward out of engagement with the racks 1 and 2 and over to the rack 6. Immediately the dog is disengaged from the teeth of the rack 1 and 2, the driving mechanism of the carriage shoots it forward until the tooth 7 (representing "30") comes into contact with the dog e, and is thereby arrested. When this shall have occurred the pressure upon the lever P is to be released and the parts permitted to resume their normal position again. Then the imprinting of the amount "$5.00" may be proceeded with. If, however, it be desired to use the tooth at "50" instead of the one at the "30," another depression of the lever P must be made after the carriage has come to a stop at the tooth "30" and then the writing begun again in the well-known way.

It will of course be understood that the operation just described may be repeated at every line of the bill or statement of account, and thus the amounts of the charges all written in a perfect or regular column.

The modification shown at Figs. 6, 7, and 8 consists in making the rack 6 with a longitudinal slot 19, in which works an adjustable tooth or stop 20, that is formed with a square portion 21 to prevent its turning within the slot, and with a threaded shank 22, upon which is screwed a binding-nut 23, for securing the tooth against longitudinal movement when it is desired to be set at any given locality. As will be readily understood, this tooth 20 may be moved back and forth along the slot 19 and fixed at any point to suit the operator, and when in position will have the same mode of action as any of the teeth 7 formed fast on the bar 6. (Illustrated at Fig. 3.)

The modification shown at Figs. 9, 10, and 11 consists in forming the bar 6 with a series of vertical holes or perforations 24, and using in conjunction therewith a removable pin or tooth 25. The operation of this tooth is essentially the same as the teeth before described, and, as will be understood, it may be set at any desired point along the bar 6.

By the use of the adjustable teeth 21 and 25 I provide for arresting the carriage automatically (when using the variable spacing-levers) at any predetermined point.

Of course it will be understood that the mechanism for releasing the carriage from the step-by-step moving mechanism may be used without the rack 6, for the purpose of permitting the driving mechanism to swiftly propel the carriage; but in such cases it will be apparent that it will be requisite to use one hand at the carriage to stop the latter at the desired locality.

What I claim as new, and desire to secure by Letters Patent, is—

1. In a type-writing machine, the combination, with the carriage, the driving mechanism, and the rocking frame carrying a dog or pawl, of a stop to limit the forward vibration of the rocking frame, and an arm or lever to remove said stop and permit a further forward vibration of the rocking frame and a releasement therefrom of the carriage, substantially as and for the purposes set forth.

2. In a type-writing machine, the combination, with the driving mechanism, the carriage, the racks 1 and 2 thereon, and the rocking frame carrying the dog or pawl, of a stop to limit the forward vibration of the rocking frame, and an arm or lever for removing said stop and permitting a further forward vibration of the rocking frame and a disengagement of the dog or pawl from the racks 1 and 2, as and for the purpose set forth.

3. In a type-writing machine, the combination, with the driving mechanism, the carriage, the racks 1 and 2 thereon, and the rocking frame carrying the dog or pawl, of a pivoted stop for said rocking frame, and an arm or lever for vibrating said pivoted stop, as and for the purpose set forth.

4. In a type-writing machine, the combination of the driving mechanism, the carriage, the racks 1 and 2 thereon, the rocking frame carrying a dog or pawl, the keys or levers P P', arranged on opposite sides of the machine, the stop for said rocking frame, and the lever or arm for operating said stop connected to the key or lever P, the combination being such, as described, that the ordinary step-by-step spacing movements of the carriage are effected through the operations of the key or lever P', and the liberation of the carriage for rapid movements through the operations of the key or lever P, as set forth.

5. In a type-writing machine, the combination of the driving mechanism, the carriage, the racks 1, 2, and 6 thereon, the latter provided with a less number of teeth, and the rocking frame carrying the dog or pawl, of a stop for said rocking frame, and an arm or lever for operating said stop, whereby the dog or pawl may be disengaged from the teeth of the racks 1 and 2, for the purpose described, and engaged with the teeth or a tooth on the rack 6, as set forth.

6. In a type-writing machine, the combination of the driving mechanism, the rocking frame carrying the dog or pawl, the stop for said rocking frame, the arm or lever for operating said stop, the carriage, and the racks 1, 2, and 6 thereon, the latter provided with an adjustable tooth, as and for the purpose set forth.

7. In a type-writing machine, the combination of the driving mechanism, the rocking frame carrying the dog or pawl, the stop for said rocking frame, the arm or lever for operating said stop, the carriage, the racks 1, 2, and 6, the latter formed with an elongated slot and provided with an adjustable tooth, as and for the purposes set forth.

8. In a type-writing machine, the combination of the driving mechanism, the rocking frame carrying the dog or pawl, the carriage provided with the racks 1, 2, and 6, the latter having a less number of teeth, and means, substantially as described, for vibrating the rocking frame and throwing the dog farther forward to co-operate with the rack 6, as set forth.

9. In a type-writing machine, the combination, with the carriage, of an adjustable column-stop, a dog to engage the same, and a finger-piece or key to actuate said dog, substantially as and for the purpose set forth.

10. In a type-writing machine, the combination, with the dog and slotted rack, of a stop adjustably arranged on said rack, substantially as and for the purpose set forth.

Signed at New York city, in the county of New York and State of New York, this 15th day of July, A. D. 1886.

JOHN H. SCHULTE.

Witnesses:
H. D. DONNELLY,
JACOB FELBEL.